(12) United States Patent
Yamada et al.

(10) Patent No.: US 8,237,894 B2
(45) Date of Patent: Aug. 7, 2012

(54) COLOR FILTER AND LIQUID CRYSTAL DISPLAY DEVICE

(75) Inventors: Kazunori Yamada, Tokyo (JP); Takashi Kanoh, Tokyo (JP); Hideyo Tanaka, Tokyo (JP); Yukino Miyagawa, Tokyo (JP); Satoshi Ohkuma, Tokyo (JP); Mie Shimizu, Tokyo (JP); Takeshi Itoi, Tokyo (JP)

(73) Assignees: Toyo Ink Mfg. Co., Ltd., Tokyo (JP); Toppan Printing Co., Ltd., Tokyo (JP)

( * ) Notice: Subject to any disclaimer, the term of this patent is extended or adjusted under 35 U.S.C. 154(b) by 656 days.

(21) Appl. No.: 12/418,122

(22) Filed: Apr. 3, 2009

(65) Prior Publication Data
US 2009/0190064 A1    Jul. 30, 2009

Related U.S. Application Data

(63) Continuation of application No. PCT/JP2007/069159, filed on Oct. 1, 2007.

(30) Foreign Application Priority Data

Oct. 5, 2006  (JP) ................................ 2006-274466

(51) Int. Cl.
*G02F 1/1335* (2006.01)
(52) U.S. Cl. .......................................... 349/106; 349/61
(58) Field of Classification Search ............... 349/61, 349/65, 106; 362/612
See application file for complete search history.

(56) References Cited

U.S. PATENT DOCUMENTS

| 8,049,844 | B2 * | 11/2011 | Okutsu et al. ................. 349/106 |
| 2004/0105265 | A1 | 6/2004 | Takizawa |
| 2006/0183037 | A1 | 8/2006 | Takizawa |
| 2007/0247565 | A1 * | 10/2007 | Sasaki et al. .................... 349/70 |
| 2008/0212305 | A1 * | 9/2008 | Kawana et al. ................. 362/84 |

FOREIGN PATENT DOCUMENTS

| JP | 2004-145275 | 5/2004 |
| JP | 2004-177292 | 6/2004 |
| JP | 2005-165307 | 6/2005 |
| JP | 2005-111707 | 11/2005 |
| JP | 2006-47975 | 2/2006 |

OTHER PUBLICATIONS

International Search Report for PCT/JP2007/069159, mailed Dec. 25, 2007.

* cited by examiner

*Primary Examiner* — Edward Glick
*Assistant Examiner* — David Chung
(74) *Attorney, Agent, or Firm* — Nixon & Vanderhye P.C.

(57) ABSTRACT

A color filter includes a red filter segment, a green filter segment and a blue filter segment, on a substrate, wherein when a pseudo-white LED is used, an area of a triangle defined by three chromaticity points of the red, green and blue filter segments expressed as $(x_R, y_R)$, $(x_G, y_G)$ and $(x_B, y_B)$ on the x-y chromaticity diagram occupies 72% or more of an area standard triangle defined by defined by 3 points of red (0.67, 0.33), green (0.21, 0.71) and blue (0.14, 0.08), and the color filter has a color temperature of 6000K or more. Each of the red, green and blue filter segments has a thickness of 3.3 μm or less. A liquid crystal display device includes such color filter and the pseudo-white LED.

5 Claims, 2 Drawing Sheets

COLOR FILTER AND LIQUID CRYSTAL DISPLAY DEVICE

CROSS REFERENCE TO RELATED APPLICATIONS

This is a Continuation Application of PCT Application No. PCT/JP2007/069159, filed Oct. 1, 2007, which was published under PCT Article 21(2) in Japanese.

This application is based upon and claims the benefit of priority from prior Japanese Patent Application No. 2006-274466, filed Oct. 5, 2006, the entire contents of which are incorporated herein by reference.

BACKGROUND OF THE INVENTION

1. Field of the Invention

The present invention relates to a color filter used, for example, in a color liquid crystal display device, and a liquid crystal display device provided with the same.

2. Description of the Related Art

In recent years, a color liquid crystal display device has been used in various applications such as a monitor for personal computers (PCs), a display for cell phones, laptop PCs and personal digital assistants, because of advantages such as lower power consumption and space saving, and has also been used in liquid crystal televisions in recent years as a substitute for a conventional CRT-based television.

In liquid crystal television applications, color reproducibility is considered important. The color reproducibility of a color liquid crystal display device is determined by the colors of lights emitted from red, green and blue filter segments and is evaluated on the basis of the area of a triangle (hereinafter referred to as area A) defined by the three chromaticity points of red, green and blue filter segments expressed as $(x_R, y_R)$, $(x_G, y_G)$ and $(x_B, y_B)$ on the x-y chromaticity diagram. More specifically, the color reproducibility is expressed as the ratio of the area A to the area (standard area) of the triangle defined by 3 points of red (0.67, 0.33), green (0.21, 0.71) and blue (0.14, 0.08) that are the three primary colors in the standard system prescribed by U.S. National Television System Committee (NTSC) ((area A/standard area)×100; the unit is %; hereinafter abbreviated as NTSC ratio). The NTSC ratio is about 40 to 50% for general laptop computers, about 50 to 60% for PC monitors and about 72% for liquid crystal televisions.

In order to increase the NTSC ratio, it is necessary to increase the color purity of each filter segment. However, as the color purity of the filter segment is increased, the light utilization efficiency of a backlight (represented by the lightness Y value) is decreased. Therefore, high electric power is required in order to increase the Y value while maintaining high color purity. Among conventional color liquid crystal display devices, products powered mainly with a battery, such as personal digital assistants and cell phones, do not use high electric power because of an emphasis on power consumption, and thus the NTSC ratio thereof is as low as 30 to 50%. However, as the opportunity of watching photos and TV programs on personal digital assistants and on displays of cell phones is increasing in recent years, there is increasing demand for a higher NTSC ratio even in personal digital assistants and displays of cell phones. A cold-cathode tube backlight is used as a backlight in laptop PCs, monitors and liquid crystal televisions, while a pseudo-white LED of lower power consumption formed by coating the surface of a blue LED with a phosphor is often used as a backlight in displays of products powered mainly with a battery such as personal digital assistants and cell phones.

The pseudo-white LED formed by coating the surface of a blue LED emits white light as a result of the blue light emitted by the blue LED passing through the phosphor-coated layer. The phosphor-coated layer has a function of converting the blue light to a light of a longer wavelength. All the blue lights emitted by the blue LED are not converted to the light of the longer wavelength. Thus, the pseudo-white LED emits a mixed light of the remainder blue light and the light of the longer wavelength, which is recognized as white light by an observer.

Therefore, the pseudo-white LED formed by coating the surface of a blue LED is different in wavelength and spectrum peak from the cold-cathode tube backlight as the light source. The spectral characteristics of the three color filters of red, green and blue used in conventional color liquid crystal display devices have been designed so as to be adapted to the light-emitting characteristics of the cold-cathode tube backlight.

In order to improve the color reproducibility when the pseudo-white LED is used, filter segments are required, which have spectral characteristics different is from those of the filter segments used in the cold-cathode tube backlight. Techniques of improving color reproducibility where white LED is used are disclosed in Jpn. Pat. Appln. KOKAI Publication No. 2004-177592 for a green filter segment and in Jpn. Pat. Appln. KOKAI Publication No. 2004-145275 for a red filter segment.

However, not only the color reproducibility of red, green and blue colors, but also the color reproducibility and lightness (Y value) of white color are important in the color liquid crystal device. The color reproducibility and lightness (Y value) of white color cannot be improved by merely improving the color reproducibility of each filter segment.

BRIEF SUMMARY OF THE INVENTION

Accordingly, an object of the present invention is to provide a color filter with the color reproducibility and lightness (Y value) also optimized when a pseudo-white LED formed by coating the surface of a blue LED with a phosphor is used as a light source. Another object of the present invention is to provide a color liquid crystal display device using a pseudo-white LED as a light source, which is excellent in the color reproducibility of each color of red, green and blue and also in white color reproducibility.

According to a first aspect of the invention, there is provided a color filter comprising a red filter segment, a green filter segment and a blue filter segment, on a substrate, wherein when a pseudo-white LED is used which has spectral properties such that it has a peak wavelength ($\lambda 1$) at which an emission intensity becomes the highest, within a wavelength range of 430 nm to 485 nm, a peak wavelength ($\lambda 2$) of a second emission intensity within a wavelength range of 520 nm to 580 nm and a peak wavelength ($\lambda 3$) of a third emission intensity within a wavelength range of 610 nm to 670 nm, a ratio (I2/I1) of an emission intensity I2 at the wavelength $\lambda 2$ to an emission intensity I1 at the wavelength $\lambda 1$ is 0.2 or more, but 0.7 or less, and a ratio (I3/I1) of an emission intensity I3 at the wavelength $\lambda 3$ to the emission intensity I1 at the wavelength $\lambda 1$ is also 0.2 or more, but 0.7 or less, an area of a triangle defined by three chromaticity points of the red, green and blue filter segments expressed as $(x_R, y_R)$, $(x_G, y_G)$ and $(x_B, y_B)$ on the x-y chromaticity diagram occupies 72% or more of an area standard triangle defined by 3 points of red (0.67, 0.33), green (0.21, 0.71) and blue (0.14, 0.08), and the color filter has a color temperature of 6000K or more, and wherein each of the red, green and blue filter segments has a thickness of 3.3 µm or less.

According to a second aspect of the invention, there is provided a liquid crystal display device comprising the color filter of the present invention and a pseudo-white LED having spectral properties such that it has a peak wavelength (λ1) at which an emission intensity becomes the highest, within a wavelength range of 430 nm to 485 nm, a peak wavelength (λ2) of a second emission intensity within a wavelength range of 520 nm to 580 nm and a peak wavelength (λ3) of a third emission intensity within a wavelength range of 610 nm to 670 nm, a ratio (I2/I1) of an emission intensity I2 at the wavelength λ2 to an emission intensity I1 at the wavelength λ1 is 0.2 or more, but 0.7 or less, and a ratio (I3/I1) of an emission intensity I3 at the wavelength λ3 to the emission intensity I1 at the wavelength λ1 is also 0.2 or more, but 0.7 or less.

DETAILED DESCRIPTION OF THE INVENTION

First, a color filter according to the present invention will be described.

A color filter according to the present invention has a red filter segment, a green filter segment and a blue filter segment, on a substrate. When a pseudo-white LED is used which has spectral properties such that it has a peak wavelength (λ1) at which an emission intensity becomes the highest, within a wavelength range of 430 nm to 485 nm, a peak wavelength (λ2) of a second emission intensity within a wavelength range of 520 nm to 580 nm and a peak wavelength (λ3) of a third emission intensity within a wavelength range of 610 nm to 670 nm, a ratio (I2/I1) of an emission intensity I2 at the wavelength λ2 to an emission intensity I1 at the wavelength λ1 is 0.2 or more, but 0.7 or less, and a ratio (I3/I1) of an emission intensity I3 at the wavelength λ3 to the emission intensity I1 at the wavelength λ1 is also 0.2 or more, but 0.7 or less, an area of a triangle defined by three chromaticity points of the red, green and blue filter segments expressed as $(x_R, y_R)$, $(x_G, y_G)$ and $(x_B, y_B)$ on the x-y chromaticity diagram occupies 72% or more of an area standard triangle defined by 3 points of red (0.67, 0.33), green (0.21, 0.71) and blue (0.14, 0.08), and the color filter has a color temperature of 6000K or more. Further, the thickness of each of the red, green and blue filter segments is 3.3 µm or less.

The NTSC ratio is a value indicative of a color reproducing area. To enlarge the color reproducing area, the NTSC ratio should be 72% or more that is the color reproduction range of televisions. When the NTSC ratio is less than 72%, the color reproducing area is narrow, and thus the color reproducibility is inferior.

Color temperature is a value indicative of the hue of white color. As color temperature is decreased, white becomes yellowish, while as color temperature is increased, white becomes bluish. Since the color temperature is decreased upon passage through a polarizer essential for the liquid crystal display device, the color temperature should be 6000K or more and is desirably 6500K or more. Further, as the color temperature is increased, the white hue seems more bluish, but the color temperature is desirably 25000K or less seen in the blue-sky light on a clear day.

As the film thickness of the red, green or blue filter segment is increased, the color reproducing area can be broadened, but a thicker film requires a thicker applied film thickness, resulting in a longer time in drying and a longer time in development, leading to deterioration in productivity. Hence, the film thickness of each filter segment is set at 3.3 µm or less.

Each of the red, green and blue filter segments, which the color filter of the present invention comprises, is formed by using a colored composition containing a pigment carrier consisting of a transparent resin, its precursor or a mixture thereof, a pigment, and if necessary an organic solvent.

Figure 1:
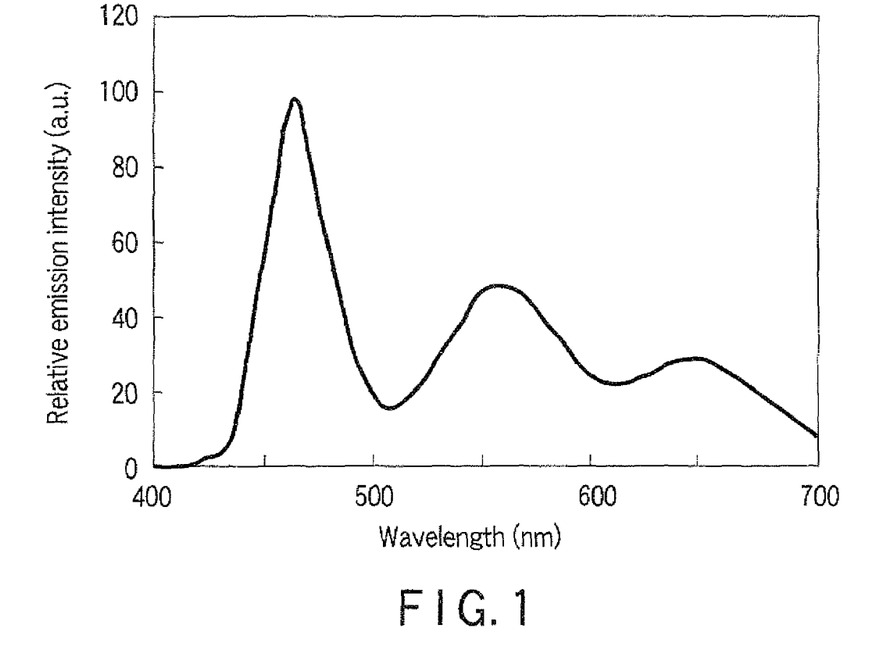
FIG. 1 is an emission spectrum of a pseudo-white LED (SDPW 50 BOB) manufactured by Seiwa Denki.
Figure 2:
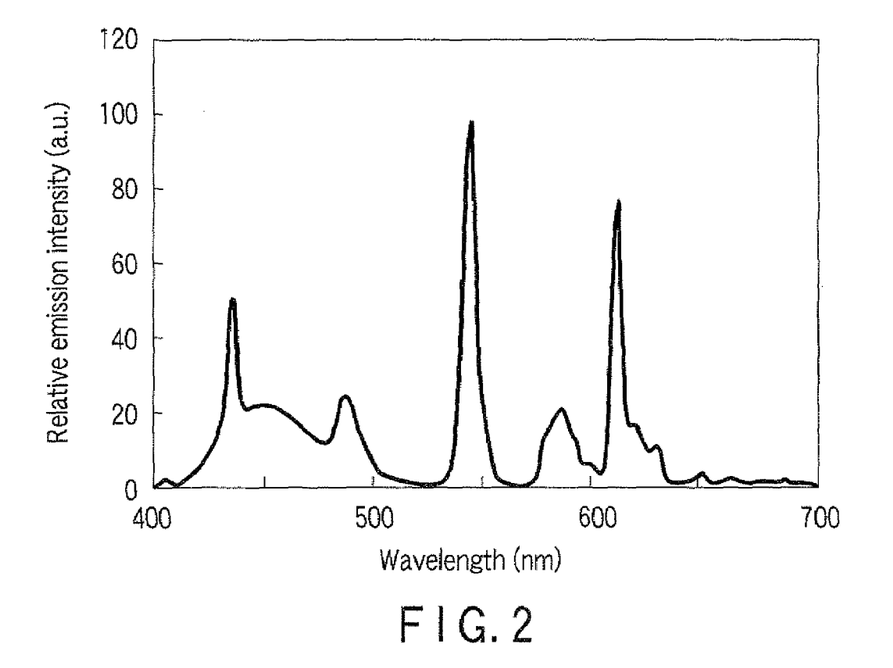
FIG. 2 is an emission spectrum of a cold-cathode tube.

A pseudo-white LED having spectral properties such that it has a peak wavelength (λ1) at which an emission intensity becomes the highest, within a wavelength range of 430 nm to 485 nm, a peak wavelength (λ2) of a second emission intensity within a wavelength range of 520 nm to 580 nm and a peak wavelength (λ3) of a third emission intensity within a wavelength range of 610 nm to 670 nm, a ratio (I2/I1) of an emission intensity I2 at the wavelength λ2 to an emission intensity I1 at the wavelength λ1 is 0.2 or more, but 0.7 or less, and a ratio (I3/I1) of an emission intensity I3 at the wavelength λ3 to the emission intensity I1 at the wavelength λ1 is also 0.2 or more, but 0.7 or less (hereinafter referred to as pseudo-white LED of the invention) is commercially available, and can be obtained, for example, under the trade name SDPW 50 BOB from Seiwa Denki, Japan. FIG. 1 shows spectral characteristics of pseudo-white LED SDPW 50 BOB manufactured by Seiwa Denki. Further, FIG. 2 shows spectral characteristics of a typical cold-cathode tube. In FIGS. 1 and 2, relative emission intensity is expressed in arbitrary unit (a. u.) on the ordinate.

As can be seen from FIGS. 1 and 2, the white LED of the invention and the cold-cathode tube are different in spectral characteristics. Accordingly, when the pseudo-white LED of the invention is used as a light source, an NTSC ratio of 72% or more cannot be achieved by using pigments the same as or similar to those used in the conventional color filter for a cold-cathode tube. Thus, the type and composition of pigments should be adapted to the pseudo-white LED of the invention.

<Pigments>

For the green filter segment, green pigments such as C.I. Pigment Green 7, 10, 36 and 37 may be used. A yellow pigments may be concomitantly used. The yellow pigment includes C.I. Pigment Yellow 1, 2, 3, 4, 5, 6, 10, 12, 13, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 123, 126, 127, 128, 129, 138, 139, 147, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 198, 213, and 214.

In the case where the green filter segment contains at least three pigments selected from C.I. Pigment Green 36, C.I. Pigment Green 7, C.I. Pigment Yellow 139, C.I. Pigment Yellow 150 and C.I. Pigment Green 185, and the selected at least three pigments comprises at least one green pigment selected from the group consisting of C.I. Pigment Green 36 and C.I. Pigment Green 7, and at least one yellow pigment selected from the group consisting of C.I. Pigment Yellow 139, C.I. Pigment Yellow 150 and C.I. Pigment Yellow 185, the lightness (Y value) of white becomes higher compared to a green filter segment containing one green pigment and one yellow pigment, and the thickness of the green filter segment can be 3.3 μm or less. Thus, the case noted above is desirable. The combination of at least three pigments contained in the green filter segment includes a combination of three pigments: C.I. Pigment Green 36, C.I. Pigment Green 7 and C.I. Pigment Yellow 150 (preferably in a weight ratio of 20-80/ 15-75/5-65); a combination of three pigments: C.I. Pigment Green 36, C.I. Pigment Green 7 and C.I. Pigment Yellow 185 (preferably in a weight ratio of 20-80/15-75/5-65); a combination of three pigments: C.I. Pigment Green 36, C.I. Pigment Green 7 and C.I. Pigment Yellow 139 (preferably in a weight ratio of 20-80/15-75/5-65); and a combination of three pigments: C.I. Pigment Green 36, C.I. Pigment Yellow 150 and C.I. Pigment Yellow 185 (preferably in a weight ratio of 40-90/15-55/5-55). Particularly, in the case where the green filter segment contains four pigments: C.I. Pigment Green 36, C.I. Pigment Green 7, C.I. Pigment Yellow 150 and C.I. Pigment Yellow 185, the lightness (Y value) of white becomes the highest, and therefore such case is desirable. C.I. Pigment Green 36, C.I. Pigment Green 7, C.I. Pigment Yellow 150 and C.I. Pigment Yellow 185 are preferably blended in a weight ratio of 20-80/5-70/5-70/5-70.

For the red filter segment, red pigments such as C.I. Pigment Red 7, 14, 41, 48:2, 48:3, 48:4, 81:1, 81:2, 81:3, 81:4, 146, 168, 177, 178, 179, 184, 185, 187, 200, 202, 208, 210, 246, 254, 255, 264, 270, 272 and 279 may be used. The red filter segment desirably contains at least two pigments selected from C.I. Pigment Red 254, C.I. Pigment Red 177 and C.I. Pigment Red 179. A combination of C.I. Pigment Red 254 and C.I. Pigment Red 177 (preferably in a weight ratio of 10-90/10-90) or a combination of C.I. Pigment Red 177 and C.I. Pigment Red 179 (preferably in a weight ratio of 10-90/10-90) is most desirable because the color temperature can be increased and the white lightness (Y value) can also be increased. When only C.I. Pigment Red 254 is used, the color temperature is decreased. When only C.I. Pigment Red 177 or only C.I. Pigment Red 179 is used, the white lightness (Y value) is decreased.

For the blue filter segment, blue pigments such as C.I. Pigment Blue 15, 15:1, 15:2, 15:3, 15:4, 15:6, 16, 22, 60, and 64 can be used, a violet pigment such as C.I. Pigment Violet 23 can be concomitantly used. In the case where the blue filter segment contains C.I. Pigment Blue 15:6 and C.I. Pigment Violet 23 and the ratio ($G_{B15:6}/G_{V23}$) of the weight ($G_{B15:6}$) of C.I. Pigment Blue 15:6 and the weight ($G_{V23}$) of C.I. Pigment Violet 23 is 85/15 to 40/60, the white lightness (Y value) can becomes higher and the color temperature becomes higher. Thus, such case is desirable. The C.I. Pigment Blue 15:6/C.I. Pigment Violet 23 weight ratio is more preferably 80/20 to 50/50. When the C.I. Pigment Blue 15:6/C.I. Pigment Violet 23 weight ratio is 100/0 to 85/15, the blue filter segment exceeds 3.3 μm in film thickness. When the C.I. Pigment Blue 15:6/C.I. Pigment Violet 23 weight ratio is 40/60 to 0/100, the lightness of the blue filter segment is decreased, and the white color temperature becomes lower.

When the pseudo-white LED of the invention is used as a light source, the NTSC ratio can become 72% or more, the color temperature of white can become 6000K or more, and the white lightness (Y value) can become higher when a color filter is constituted by a green filter segment containing three pigments that are C.I. Pigment Green 36, C.I. Pigment Green 7 and C.I. Pigment Yellow 150, three pigments that are C.I. Pigment Green 36, C.I. Pigment Green 7 and C.I. Pigment Yellow 185, three pigments that are C.I. Pigment Green 36, C.I. Pigment Green 7 and C.I. Pigment Yellow 139, three pigments that are C.I. Pigment Green 36, C.I. Pigment Yellow 150 and C.I. Pigment Yellow 185 or four pigments that are C.I. Pigment Green 36, C.I. Pigment Green 7, C.I. Pigment Yellow 150 and C.I. Pigment Yellow 185, a red filter segment containing a combination of C.I. Pigment Red 254 and C.I. Pigment Red 177 or a combination of C.I. Pigment Red 177 and C.I. Pigment Red 179, and a blue filter segment containing C.I. Pigment Blue 15:6 and C.I. Pigment Violet 23 in a weight ratio of 85/15 to 40/60.

Preferably, the pigment is finely pulverized by kneading a mixture containing the pigment, a water-soluble inorganic salt, and a water-soluble organic solvent which substantially does not dissolve the water-soluble inorganic salt (this step is hereinafter referred to as salt milling), and then removing the water-soluble inorganic salt and water-soluble organic solvent. When the finely pulverized pigment is used, the spectral transmittance of a filter segment is enhanced. During the salt milling, a basic group-containing derivative, a resin which is at least partially soluble in the water-soluble organic solvent or a dispersant may be additionally used. When the finely pulverized pigment obtained by these treatments is used, a filter segment with further improvement in optical properties can be formed.

<Pigment Carrier>

The pigment carrier is composed of a transparent resin, its precursor or a mixture of the transparent resin and its precursor, and provides a resinous binder in the filter segment formed. The transparent resin preferably has a light transmittance of 80% or more, more preferably 95% or more, in the entire wavelength region of 400 to 700 nm in the visible light region. The transparent resin includes a thermoplastic resin, a thermosetting resin and an active energy-curable resin, and its precursor includes monomers or oligomers which form transparent resin upon curing by irradiation of active energy. These can be used singly or as a mixture of two or more thereof.

Examples of the thermoplastic resin include a butyral resin, a styrene-maleic acid copolymer, a chlorinated polyethylene, a chlorinated polypropylene, a polyvinyl chloride, a vinyl chloride-vinyl acetate copolymer, a polyvinyl acetate, a polyurethane resin, a polyester resin, an acrylic resin, an alkyd resin, a polystyrene, a polyamide resin, a rubber-based resin, a cyclized rubber-based resin, celluloses, a polyethylene, a polybutadiene, and a polyimide resin. Examples of the thermosetting resin include an epoxy resin, a benzoguanamine resin, a rosin-modified maleic acid resin, a rosin-modified fumaric acid resin, a melamine resin, a urea resin, and a phenolic resin.

As the active energy-curable resin, use may be made of a resin prepared by allowing a linear polymer having a reactive substituent such as a hydroxyl group, a carboxyl group or an amino group to react with a (meth)acrylic compound having a reactive substituent such as an isocyanate group, an aldehyde group or an epoxy group, or with cinnamic acid, to introduce photocrosslinkable groups such as (meth)acryloyl group or styryl group into the linear polymer. A half-esterified compound prepared by allowing a liner polymer containing an acid anhydride such as a styrene-maleic anhydride copolymer or an α-olefin-maleic anhydride to be half-esterified with a (meth)acrylic compound containing a hydroxyl group, such as hydroxyalkyl(meth)acrylate.

The monomer or oligomer as a precursor of the transparent resin includes various acrylates and methacrylates such as methyl(meth)acrylate, ethyl (meth)acrylate, 2-hydroxyethyl (meth)acrylate, 2-hydroxypropyl(meth)acrylate, cyclohexyl (meth)acrylate, β-carboxyethyl(meth)acrylate, polyethyleneglycol di(meth)acrylate, 1,6-hexanediol di(meth)acrylate, triethyleneglycol di(meth)acrylate, tripropyleneglycol di(meth)acrylate, trimethylolpropane tri(meth)acrylate, pentaerythritol tri(meth)acrylate, 1,6-hexanediol diglycidylether di(meth)acrylate, bisphenol A diglycidylether di(meth)acrylate, neopentylglycol diglycidylether di(meth)acrylate, dipentaerythritol hexa (meth)acrylate, tricyclodecanyl(meth)acrylate, ester acrylate, (meth)acrylate of methylolated melamine, epoxy(meth)acrylate and urethane acrylate; (meth)acrylic acid, styrene, vinyl acetate, hydroxyethyl vinylether, ethyleneglycol divinylether, pentaerythritol trivinylether, (meth)acrylamide, N-hydroxymethyl(meth)acrylamide, N-vinylformamide and acrylonitrile. These compounds may be used alone or as a mixture of two or more thereof.

The pigment carrier can be used in an amount of preferably 50 to 700 parts by weight, more preferably 100 to 400 parts by weight, based on 100 parts by weight of the total of the pigments.

<Organic Solvent>

To facilitate formation of a filter segment, an organic solvent may be contained in each colored composition herein after described so that the pigment can be easily sufficient dispersed in the pigment carrier and applied onto a transparent substrate such as a glass substrate to a thickness of 3.3 μm or less, after drying. Examples of the organic solvent include cyclohexanone, isoamyl acetate, propylene glycol monomethyl ether acetate, ethyl 3-ethoxypropionate, propylene glycol diacetate, diethylene glycol dimethyl ether, 1,2,3-trichloropropane, 2-heptane, 4-heptanone, m-xylene, N,N-dimethylformamide, n-butyl alcohol, o-xylene, o-chlorotoluene, ethylene glycol diethyl ether, ethylene glycol monoisopropyl ether, ethylene glycol monoethyl ether, ethylene glycol monoethyl ether acetate, ethylene glycol monopropyl ether, ethylene glycol monoethyl ether, ethylene glycol monomethyl ether acetate, propylene glycol monoethyl ether, propylene glycol monoethyl ether acetate, propylene glycol monopropyl ether, propylene glycol monomethyl ether, methyl isobutyl ketone, n-amyl acetate, n-butyl acetate, isobutyl acetate, tripropylene glycol monobutyl ether, n-propyl acetate, triacetin, propyl acetate, isobutyl alcohol, ethylene glycol mono-tertiary butyl ether, propylene glycol monomethyl ether propionate, 1,4-dioxane, 3,3,5-trimethyl-cyclohexanone, cyclohexanol acetate, γ-butyrolactone, tripropylene glycol monomethyl ether, 3-methoxy-3-methyl-1-butanol, 1,3-butanediol, 3-methyl-1,3-butanediol, 2-methyl-1,3-propanediol, diisobutyl ketone, ethylene glycol monobutyl ether, ethylene glycol monohexyl ether, ethylene glycol monobutyl ether acetate, ethylene glycol dibutyl ether, diethylene glycol monomethyl ether, diethylene glycol diethyl ether, diethylene glycol monoisopropyl ether, propylene glycol monobutyl ether, dipropylene glycol monomethyl ether, dipropylene glycol monoethyl ether, dipropylene glycol monopropyl ether, dipropylene glycol dimethyl ether, 3-methoxybutyl acetate, 3-methoxy-3-methylbutyl acetate, N,N-dimethylacetamide, N-methylpyrrolidone, p-chlorotoluene, o-diethyl benzene, m-diethyl benzene, p-diethyl benzene, o-dichlorobenzene, m-dichlorobenzene, n-butyl benzene, sec-butyl benzene, tert-butyl benzene, cyclohexanol, methyl cyclohexanol, dipropylene glycol monobutyl ether, propylene glycol phenyl ether, dipropylene glycol methyl ether acetate, 1,3-butylene glycol diacetate, diethylene glycol monoethyl ether acetate, diethylene glycol monobutyl ether, diethylene glycol monobutyl ether acetate, 3-methoxy butanol, 1,3-butylene glycol, 3,3,5-trimethyl-2-cyclohexen-1-one, diacetone alcohol, isophorone, dibasic acid ester, benzyl alcohol, and propylene glycol monomethyl ether propionate. These solvents may be used singly or as a mixture thereof. The organic solvent can be used in an amount of 800 to 4000 parts by weight, preferably 1000 to 2500 parts by weight, based on 100 parts by weight of the pigment.

<Method for Manufacturing the Colored Composition>

Each colored composition can be prepared by finely dispersing one or more kinds of pigments in the pigment carrier by using a dispersing device such as a three-roll mill, a two-roll mill, a sand mill, a kneader or an attritor. A colored composition containing two or more kinds of pigments can also be prepared by finely dispersing the respective pigments in the pigment carrier separately and then mixing the respective pigment dispersions. A dispersing aid such as a resin type pigment dispersant, a surfactant or a pigment derivative may be utilized as necessary in dispersing the pigments in the pigment carrier. Since the dispersing aid is excellent in dispersing pigments and is very effective in preventing the pigments from being re-aggregated subsequent to the initial dispersing thereof, it is possible to create a color filter which is excellent in transparency if a colored composition is used in which the pigments are dispersed in the pigment carrier using the dispersing aid. When the pigment is dispersed in the pigment carrier, an organic solvent is desirably contained for sufficiently dispersing the pigment in the pigment carrier.

Examples of the surfactant include anionic surfactants such as polyoxyethylene alkylether sulfate, sodium dodecylbenzene sulfate, alkali salts of styrene-acrylate copolymer, sodium alkylnaphthalene sulfonate, sodium alkyldiphenylether disulfonate, monoethanolamine laurylsulfate, triethanolamine laurylsulfate, ammonium laurylsulfate, monoethanolamine stearate, sodium stearate, sodium laurylsulfate, monoethanolamine salt of styrene-acrylic acid copolymer and polyoxyethylene alkylether phosphoric acid ester; nonionic surfactants such as polyoxyethylene oleyl ether, polyoxyethylene lauryl ether, polyoxyethylene nonylphenyl ether, polyoxyethylene alkyl ether phosphoric acid ester, polyoxyethylene sorbitan monostearate and polyethyleneglycol monolaurate; cationic surfactants such as alkyl quaternary ammonium slats and ethyleneoxide adduxts thereof; and amphoteric surfactants such as alkyl betaine such as alkyldimethylamino acetic acid betaine and alkylimidazoline. These surfactants may be used singly, or a mixture of two or more of them may be used. The surfactant may be used in an amount of usually 50 parts by weight or less, preferably 30 parts by weight or less, based on 100 parts by weight of the pigments.

The resin type dispersant has a pigment affinity moiety, which has a property to adsorb onto pigments, and a moiety which is compatible with the pigment carrier, and serves to stabilize the dispersion of the pigment in the pigment carrier by adsorption onto the pigment. Specific examples of the resin type dispersant include a polyurethane, a polycarboxylic acid ester such as a polyacrylate, an unsaturated polyamide, a polycarboxylic acid, a polyamine (partial) carboxylate, an ammonium salt of a polycarboxylic acid, a polyalkylamine carboxylate, a polysiloxane, a long chain polyaminoamide phosphate, a hydroxyl group-containing polycarboxylic acid ester, or modified forms of these polymers, an oily dispersing agent such as amide which is formed by reaction of poly(lower alkyleneimine) with a polyester having a free carboxyl group or a salt thereof; a water-soluble resin or water-soluble polymer such as a (meth)acrylic acid-styrene copolymer, a (meth)acrylic acid-(meth)acrylate copolymer, a styrene-maleic acid copolymer, a polyvinyl alcohol, a polyvinyl pyrrolidine; a polyester, a modified polyacrylate, an ethylene oxide/propylene oxide adduct, and phosphate ester. These materials can be employed singly or in combination of two or more kinds. The resin type dispersant may be used in an amount of usually 0.1 to 50 parts by weight, preferably 1 to 30 parts by weight, based on 100 parts by weight of the pigments.

The pigment derivative refers to a compound having a substituent introduced into an organic pigment, and serves to prevent aggregation of pigments and maintain the pigments in a finely dispersed state. Examples of the organic pigment include a diketopyrrolopyrrole pigment; an azo pigment such as an azo, diazo or polyazo; a phthalocyanine pigment such as a copper phthalocyanine, a halogenated copper phthalocyanine, a metal-free phthalocyanine; an anthraquinone pigment such as amino anthraquinone, diamino dianthraquinone, anthrapyrimidine, flavanthrone, anthoanthrone, indanthrone, pyranthrone, violanthrone; a quinacridone pigment; a dioxazine pigment; a perinone pigment; a perylene pigment; a thioindigo pigment; an isoindoline pigment; an isoindolinone pigment; a quinophthalone pigment; a thren pigment; and a metal complex pigment. As the pigment derivatives, those described in, for example, Jpn. Pat. Appln. KOKAI Publication No. 63-305173, Jpn. Pat. Appln. KOKOKU Publication Nos. 57-15620, 59-40172, 63-17102 and 5-9469, and these pigment derivatives can be used singly or as a mixture of two or more thereof.

The pigment derivative can be used in an amount of usually 0.1 to 40 parts by weight, preferably 1 to 30 parts by weight, based on 100 parts by weight of the pigments.

<Other Additives>

When each colored composition is to be cured by irradiation with ultraviolet rays, a photopolymerization initiator or the like is added to the composition.

Examples of the photopolymerization initiator include acetophenone-based photopolymerization initiators such as 4-phenoxydichloroacetophenone, 4-t-butyl-dichloroacetophenone, diethoxyacetophenone, 1-(4-isopropylphenyl)-2-hydroxy-2-methylpropan-1-one, 1 hydroxycyclohexylphenyl ketone, 2-benzyl-2-dimethylamino-1-(4-morpholinophenyl)-butan-1-one and 2-methyl-1-[(4-(methylthio)phenyl]-2-morpholinopropan-1-one; oxime ester-based photopolymerization initiators such as 1-[9-ethyl-6-(2-methylbenzoyl)-9H-carbazol-3-yl]-ethanone-1-o-acyloxime, 1,2-octadiene-1-[4-(phenylthio), 2-(O-benzoyloxime]; benzoin-based photopolymerization initiators such as benzoin, benzoin methyl ether, benzoin ethyl ether, benzoin isopropyl ether, and benzyldimethyl ketal; benzophenone-based photopolymerization initiators such as benzophenone, benzoyl benzoic acid, methyl benzoylbenzoate, 4-phenyl benzophenone, hydroxybenzophenone, acrylic benzophenone, and 4-benzoyl-4'-methyldiphenyl sulfide; thioxanthone-based photopolymerization initiators such as thioxanthone, 2-chlorothioxanthone, 2-methylthioxanthone, isopropylthioxanthone, and 2,4-diisopropylthioxanthone; triazine-based photopolymerization initiators such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-piperonyl-4,6-bis(trichloromethyl)-s-triazine, 2,4-bis(trichloromethyl)-6-styryl-s-triazine, 2-(naphtho-1-yl)-4,6-bis(trichloromethyl)-s-triazine, 2-(4-methoxy-naphtho-1-yl)-4,6-bis(trichloromethyl)-s-triazine, 2,4-trichloromethyl-(piperonyl)-6-triazine, and 2,4-trichloromethyl-(4'-methoxystyryl)-6-triazine; borate-based photopolymerization initiators; carbazole-based photopolymerization initiators; and imidazole-based photopolymerization initiators. The photopolymerization initiators can be used in an amount of 0.5 to 200 parts by weights, more preferably 20 to 150 parts by weight, based on 100 parts by weight of the monomers.

The above-noted photopolymerization initiators are used singly or in combination, and can be used in combination with a sensitizer such as α-acyloxy ester, acylphosphine oxide, methylphenyl glyoxylate, benzyl, 9,10-phenanthrene quinone, camphor quinine, ethylanthraquinone, 4,4'-diethyl isophthalophenone, 3,3',4,4'-tetra(t-butyl peroxycarbonyl) benzophenone, and 4,4'-diethylaminobenzophenone. These sensitizers can be used in an amount of 0.1 to 60 parts by weight based on 100 parts by weight of the photopolymerization initiator.

The colored composition may further contain a polyfunctional thiol acting as a chain transfer agent.

The polyfunctional thiol may be a compound having two or more thiol groups. Examples include hexane dithiol, decane dithiol, 1,4-butanediol bisthiopropionate, 1,4-butanediol bisthioglycolate, ethyleneglycol bisthioglycolate, ethyleneglycol bisthiopropionate, trimethylolpropane tristhioglycolate, trimethylolpropane tristhiopropionate, trimethylolpropane tris(3-mercaptobutyrate), pentaerythritol tetrakisthioglycolate, pentaerythritol tetrakisthiopropionate, trimercaptopropionate tris(2-hydroxyethyl)isocyanulate, 1,4-dimethylmercaptobenzene, 2,4,6-trimercapto-s-triazine, 2-(N,N-dibutylamino)-4,6-dimercapto-s-triazine, etc. These polyfunctional thiols can be employed singly or as a mixture of two more thereof.

The polyfunctional thiol can be used in an amount of 0.1 to 50 parts by weight, preferably 7 to 20 parts by weight, based on 100 parts by weight of the pigments in the colored composition.

The colored composition may contain a storage-stabilizing agent in order to stabilize a viscosity with time of the colored composition. Examples of the storage-stabilizing agent include, for example, quaternary ammonium chloride such as benzyltrimethyl chloride or diethylhydroxyamine; an organic acid such as lactic acid, oxalic acid, or methyl ether thereof; t-butylpyrocatechol; an organic phosphine such as triethyl phosphine or triphenyl phosphine; and phosphite. These storage-stabilizing agents can be used in an amount of 0.1 to 10 parts by weight based on 100 parts by weight of the pigment in the composition.

In the colored composition of the present invention, it is preferable to remove coarse particles of 5 μm or more, preferably, coarse particles of 1 μm or more, more preferably coarse particles of 0.5 μm or more as well as dusts intermingled therein by means of, for example, centrifugal separation, sintered filter or membrane filter.

<Method for Manufacturing the Color Filter>

The color filter of the present invention is provided, on a transparent substrate or a light-reflecting substrate, with at least three colored (red, green and blue) filter segments. The filter segments can be formed by printing or photolithography with each of the colored compositions.

As the transparent substrate, it is possible to employ a glass plate made of a glass such as a soda-lime glass, low alkali borosilicate glass or alkali-free aluminoborosilicate glass, and a resin plate made of a resin such as polycarbonate, poly(methyl methacrylate) or polyethylene terephthalate. Further, to drive the liquid crystal after the fabrication of a liquid crystal panel, a transparent electrode made of, e.g., indium oxide or tin oxide may be formed on the surface of the glass plate or resin plate.

Since the patterning of the color filter segments by means of printing method can be performed by simply repeating the printing and drying of a colored composition that has been prepared as a printing ink, the printing method is advantageous as a manufacturing method of color filter in terms of manufacturing cost and mass production. Further, due to the recent development of printing technique, it is now possible to perform the printing of very fine pattern which is excellent in dimensional precision as well as in smoothness. In order to perform the printing, the ink may preferably be formulated such that it may not be dried or solidified on the surface of a printing plate or on a blanket. Furthermore, it is also important to control the fluidity of ink on a printing machine, and it may be possible to adjust the viscosity of ink by using a dispersant or an extender pigment.

When each of the color filter segments is formed by means of photolithography method, a colored composition which has been formulated as a solvent development type or alkali development type colored resist material is coated on a transparent substrate by a coating method such as spray coating, spin coating, slit coating or roll coating so as to obtain a dried film thickness of 0.5 to 3.3 µm. The film dried as required is then exposed to ultraviolet rays through a mask having a predetermined pattern disposed in contact with or away from this film. Subsequently, the resultant film is dipped in, or sprayed with, a solvent or an alkaline developing solution, to remove the uncured portions, thereby forming a desired pattern. These procedures are repeated for forming the pattern of other colors, thus manufacturing a color filter. Additionally, if required, the coated film may be heated so as to promote the polymerization of the colored resist material. According to the photolithography, it is possible to manufacture a color filter with higher precision as compared with that obtained by the printing method mentioned above.

In performing the development of the colored composition prepared as an alkali development type resist material, an aqueous solution of, e.g., sodium carbonate or sodium hydroxide, or an organic alkali such as dimethylbenzylamine or triethanolamine may be used as the alkaline developing solution. Further, an anti-foaming agent or a surfactant may be added to the developing solution.

In order to enhance the sensitivity to ultraviolet exposure, a water-soluble or alkali-soluble resin such as polyvinyl alcohol or a water-soluble acrylic resin may be applied onto the colored resist material that has been coated and dried in advance, thereby forming a film capable of preventing inhibition by oxygen of polymerization. Thereafter, the colored resist material is subjected to ultraviolet exposure.

The color filter of the present invention can be manufactured by means of an electrodeposition method or a transferring method, other than the aforementioned methods. The electrodeposition method is a method in which by utilizing a transparent conductive film formed on a transparent substrate, each of the color filter segments is electrodeposited on the transparent conductive film through electrophoresis of colloidal particles, thereby manufacturing the color filter.

On the other hand, the transferring method is a method in which each colored filter segment layer is formed in advance on the surface of a releasable transferring base sheet and then this colored filter segment layer is transferred onto a desired transparent substrate.

When a black matrix is formed in advance on a transparent substrate or a light-reflecting substrate prior to the formation of the colored filter segments, the contrast ratio of the liquid crystal display panel can be further enhanced. As the black matrix, use may be made of, but not limited to, an inorganic film such as chromium, a chromium/chromium oxide multilayer film or titanium nitride, and a resin film having a light-shielding agent dispersed therein. Moreover, a thin film transistor (TFT) may be formed in advance on the transparent substrate or the light-reflecting substrate noted above, and then the colored filter segments are formed. When the colored filter segments are formed on the TFT substrate, the aperture ratio of liquid crystal display panel can be enhanced, and the brightness can be improved.

As required, an overcoat film, a columnar spacer, a transparent conductive film, a liquid crystal alignment film, etc. may be formed on the color filter of the present invention.

The liquid crystal display device comprising the color filter of the present invention will be described below.

The liquid crystal display device of the present invention is provided with the color filter of the present invention and a pseudo-white LED having the specified spectral properties.

Figure 3:
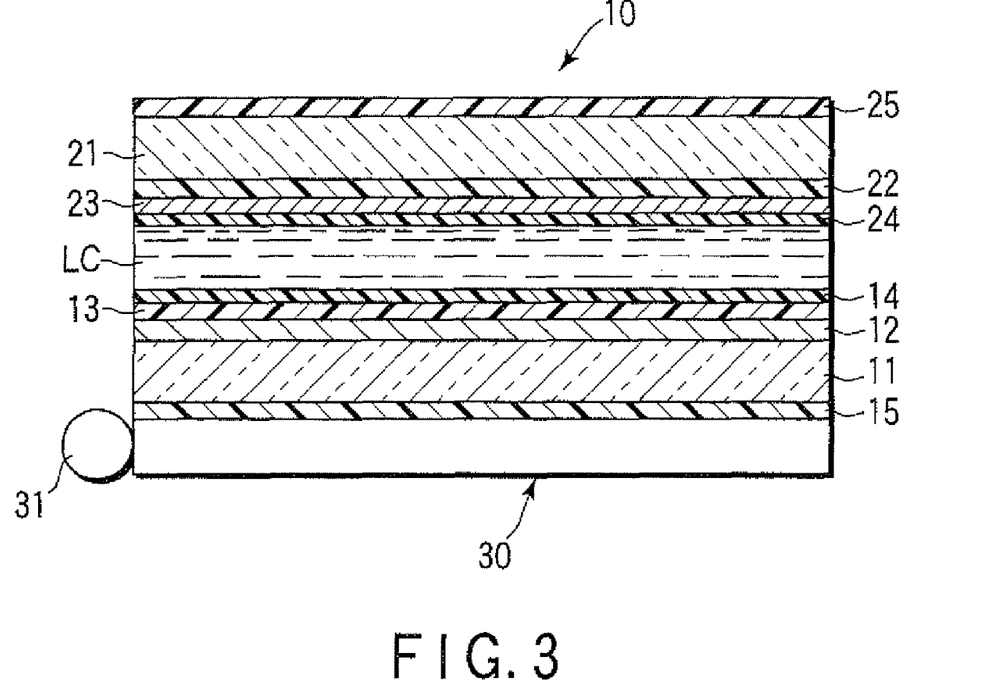
FIG. 3 is a view illustrating a liquid crystal display device provided with the color filter of the present invention.

FIG. 3 is a schematic cross section of a liquid crystal display device comprising the color filter of the present invention.

The device 10 shown in FIG. 3 comprises a pair of transparent substrates 11 and 21 opposedly disposed with a space between them, and a liquid crystal (LC) is sealed in the space between the substrates. The liquid crystal display device of the present invention may be applied to, e.g., TN (twisted nematic), STN (super twisted nematic), IPS (in-plane switching), VA (vertical alignment), OCB (optically compensated birefringence) and polymer dispersion type liquid crystal display devices.

A TFT (thin film transistor) array 12 is formed on the inner face of the first transparent substrate 11, and a transparent electrode layer 13 made of, for example, ITO is formed thereon. An orientation layer 14 is formed on the transparent electrode layer 13. Further, a polarizer 15 is formed on the outer surface of the transparent substrate 11.

On the other hand, a color filter 22 according to the present invention is formed on the inner face of the second transparent substrate 21. The red, green and blue filter segments constituting the color filter 22 are separated from one another by black matrices (not shown). A transparent protective layer (not shown) is formed, if necessary, so as to cover the color filter 22, a transparent electrode layer 23 made of, e.g., ITO is formed thereon, and an orientation layer 24 is formed, covering the transparent electrode layer 23. Further, a polarizer 25 is formed on the outer surface of the transparent substrate 21. A backlight unit 30 comprising the pseudo-white LED 31 is provided under the polarizer 15.

The pseudo-white LED may be formed of a blue LED whose surface is coated with a phosphor filter or formed of the resin packaged blue LED in which a phosphor is incorporated in the package. The pseudo-white LED has spectral properties such that it has a peak wavelength ($\lambda 1$) at which an emission intensity becomes the highest, within a wavelength range of 430 nm to 485 nm, a peak wavelength ($\lambda 2$) of a second emission intensity within a wavelength range of 520 nm to 580 nm and a peak wavelength ($\lambda 3$) of a third emission intensity within a wavelength range of 610 nm to 670 nm, a ratio (I2/I1) of an emission intensity I2 at the wavelength $\lambda 2$ to an emission intensity I1 at the wavelength $\lambda 1$ is 0.2 or more, but 0.7 or less, and a ratio (I3/I1) of an emission intensity I3 at the wavelength $\lambda 3$ to the emission intensity I1 at the wavelength $\lambda 1$ is also 0.2 or more, but 0.7 or less. The blue LED is an LED which emits blue light (wavelength is 470 nm for instance) such as InGaN-based or GaN-based semiconductor materials. The phosphor filter absorbs a part of the blue light from the blue LED and emits a green light having a maximum emission within the range of 520 to 500 nm, and a red light having a maximum emission within the range of 610 to 670 nm. In the pseudo-white LED of this system, a part of the blue light emitted by the blue LED passes through the phosphor layer, and the remainder is absorbed by the phosphor and converted into green and red lights. A phosphor which converts blue light to green light includes a crystal such as $CaGA_2S_4$:Eu, and a phosphor which converts blue light to green light includes a crystal such as CaS:Eu. The observer recognizes a mixed light of the blue light and the 2 color lights of green and red as white light.

Hereinafter, the present invention is described in more detail by way of Examples. In the Examples and Comparative Examples, "parts" refers to "parts by weight". Further, the chemical structures of pigment derivatives are shown in Table 1.

<Preparation of Acrylic Resin Solution 1>

70.0 parts of cyclohexanone was charged in a reaction vessel including a separable 4-neck flask equipped with a thermometer, a condenser, a nitrogen gas-introducing tube and a stirrer, and heated to 80° C. After the atmosphere in the vessel was replaced by nitrogen, a mixture of 13.3 parts of n-butyl methacrylate, 4.6 parts of 2-hydroxyethyl methacrylate, 4.3 parts of methacrylic acid, 7.4 parts of p-cumylphenol ethylene oxide-modified acrylate ("Alonix M110" manufactured by Toagosei Co., Ltd.), and 0.4 part of 2,2'-azobisisobutyronitrile was added dropwise through a dropping tube over 2 hours. After finishing the dropwise addition, the reaction was continued for additional 3 hours to afford a solution of an acrylic resin having a weight average molecular weight of about 26000 (solid content: 30% by weight).

After the resulting acrylic resin solution was cooled to room temperature, about 2 g of the resin solution was removed and dried under heating at 180° C. for 20 minutes, and the nonvolatiles were measured. Based on this measured value, cyclohexanone was added to the previously synthesized resin solution in such an amount that the content of the non-volatiles became 20%, thus preparing an acrylic resin solution 1.

<Preparation of Treated Green Pigment 1>

500 parts of phthalocyanine-based green pigment C.I. Pigment Green 36 ("Lionol Green 6YK" manufactured by Toyo Ink Mfg. Co., Ltd.), 500 parts of sodium chloride and 250 parts of diethylene glycol were charged in a 1-gallon stainless steel kneader (Inoue Seisakusho Co., Ltd.) and kneaded for 4 hours at 120° C. Then, the kneaded material was charged in 5 litters of hot water and then stirred for 1 hour under heating at 70° C. to afford a slurry. Then, the slurry was repeatedly filtered and washed with water to remove the sodium chloride and diethylene glycol. The resultant material was then dried for 1 day at 80° C. to afford 490 parts of treated green pigment 1 (G1).

<Preparation of Treated Green Pigment 2>

490 parts of treated green pigment 2 (G2) was obtained in the same manner as in preparation of the treated green pigment 1 except that phthalocyanine-based green pigment C.I. Pigment Green 7 ("Lionol Green YS-07" manufactured by Toyo Ink Mfg. Co., Ltd.) was used in place of the phthalocyanine-based green pigment C.I. Pigment Green 36.

<Preparation of Treated Yellow Pigment 1>

490 parts of treated yellow pigment 1 (Y1) was obtained in the same manner as in preparation of the treated green pigment 1 except that azo-based yellow pigment C.I. Pigment Yellow 150 ("E-4GN" manufactured by LANXESS.) was used in place of the phthalocyanine-based green pigment C.I. Pigment Green 36.

<Preparation of Treated Yellow Pigment 2>

490 parts of treated yellow pigment 2 (Y2) was obtained in the same manner as in preparation of the treated green pigment 1 except that isoindoline-based yellow pigment C.I. Pigment Yellow 185 ("PALIOGEM YELLOW D1155" manufactured by BASF) was used in place of the phthalocyanine-based green pigment C.I. Pigment Green 36, and the kneading time was changed from 4 hours to 8 hours.

<Preparation of Treated Yellow Pigment 3>

490 parts of treated yellow pigment 3 (Y3) was obtained in the same manner as in preparation of the treated green pigment 1 except that isoindoline-based yellow pigment C.I. Pigment Yellow 139 ("IRGAPHOR YELLOW 2R-CF" manufactured by Ciba Specialty Chemicals) was used in place of the phthalocyanine-based green pigment C.I. Pigment Green 36, and the kneading time was changed from 4 hours to 8 hours.

<Preparation of Treated Blue Pigment 1>

200 parts of blue pigment C.I. Pigment Blue 15:6 ("LIONOL BLUE ES" manufactured by Toyo Ink Mfg. Co., Ltd.), 1600 parts of sodium chloride and 100 parts of diethylene glycol (Tokyo Kasei Co., Ltd.) were charged into a 1-gallon stainless steel kneader (Inoue Seisakusho Co., Ltd.) and kneaded for 12 hours at 70° C. Then, the kneaded material was charged into about 5 litters of hot water and then stirred for about 1 hour under heating at about 70° C. with a high-speed mixer to afford a slurry. This slurry was filtered and washed with water to remove the sodium chloride and diethylene glycol. The resultant material was then dried for 24 hours at 80° C. to afford 198 parts of blue pigment 1 (B1).

<Preparation of Treated Violet Pigment 1>

200 parts of violet pigment C.I. Pigment Violet 23 ("LIONOGEN VIOLET RL" manufactured by Toyo Ink Mfg. Co., Ltd.), 1600 parts of sodium chloride and 100 parts of diethylene glycol (Tokyo Kasei Co., Ltd.) were charged into a 1-gallon stainless steel kneader (Inoue Seisakusho Co., Ltd.) and kneaded for 3 hours at 90° C. Then, the kneaded material was charged into about 5 litters of hot water and then stirred for about 1 hour under heating at about 70° C. with a high-speed mixer to afford a slurry. This slurry was filtered and washed with water to remove the sodium chloride and diethylene glycol. The resultant material was then dried for 24 hours at 80° C. to afford 198 parts of violet pigment 1 (V1).

<Preparation of Treated Red Pigment 1>

160 parts of red pigment C.I. Pigment Red 254 ("IRGAZIN RED 2030" manufactured by Ciba Specialty Chemicals), 1600 parts of sodium chloride and 190 parts of diethylene glycol (Tokyo Kasei Co., Ltd.) were charged into a 1-gallon stainless steel kneader (Inoue Seisakusho Co., Ltd.) and kneaded for 10 hours at 60° C. Then, the kneaded material was charged into about 5 litters of hot water and then stirred for about 1 hour under heating at about 70° C. with a high-speed mixer to afford a slurry. This slurry was filtered and washed with water to remove the sodium chloride and diethylene glycol. The resultant material was then dried for 24 hours at 80° C. to afford 156 parts of red pigment 1 (R1).

<Preparation of Treated Red Pigment 2>

152 parts of red pigment C.I. Pigment Red 177 ("CROMOPHTAL RED A2B" manufactured by Ciba Specialty Chemicals), 8 parts of dispersant A-2 shown in Table 1, 1600 parts of sodium chloride and 190 parts of diethylene glycol (Tokyo Kasei Co., Ltd.) were charged into a 1-gallon stainless steel kneader (Inoue Seisakusho Co., Ltd.) and kneaded for 10 hours at 60° C. Then, the kneaded material was charged into about 5 litters of hot water and then stirred for about 1 hour under heating at about 70° C. with a high-speed mixer to afford a slurry. This slurry was filtered and washed with water to remove the sodium chloride and diethylene glycol. The resultant material was then dried for 24 hours at 80° C. to afford 156 parts of red pigment 2 (R2).

<Preparation of Treated Red Pigment 3>

500 parts of red pigment C.I. Pigment Red 179 ("Paliogen Maroon L-3920" manufactured by BASF Japan), 500 parts of sodium chloride and 250 parts of diethylene glycol were charged into a 1-gallon stainless steel kneader (Inoue Seisakusho Co., Ltd.) and kneaded for 8 hours at 120° C. Then, the kneaded material was charged into 5 L of hot water and then stirred for 1 hour under heating at 70° C. to afford a slurry. This slurry was repeatedly filtered and washed with water to remove the sodium chloride and diethylene glycol. The resultant material was then dried for 1 day at 80° C. to afford 490 parts of red pigment 3 (R3)

TABLE 1

A-1

Cu-cp; Copper phthalocyanin residue

A-2

A-3

A-4

<Preparation of Pigment Dispersions GP-1, GP-2, YP1, YP2, YP3, BP-1, VP-1, RP-1, RP-2 and RP-3>

Each of mixtures of the pigment, pigment derivative, acrylic resin solution 1 and organic solvent having compositions shown in Table 2 was stirred and mixed uniformly, and dispersed for 5 hours by means of an Eiger mill ("MINI MODEL M-250MKII" manufactured by Eiger Japan) using zirconia beads having a diameter of 1 mm. Then, 30.0 parts of cyclohexanone was added, and the mixture was filtered with a filter of 5 μm, preparing respective pigment dispersions.

TABLE 2

|  |  | Pigment Dispersion | | | | | | | | | |
|---|---|---|---|---|---|---|---|---|---|---|---|
|  |  | GP-1 | GP-2 | YP-1 | YP-2 | YP-3 | BP-1 | VP-1 | RP-1 | RP-2 | RP-3 |
|  |  | Pigment | | | | | | | | | |
|  |  | G1 | G2 | Y1 | Y2 | Y3 | B1 | V1 | R1 | R2 | R3 |
|  | Pigment Derivative | A-3 | A-3 | A-3 | A-3 | A-3 | A-1 | A-1 | A-2 | A-4 | A-4 |
| Composition (parts) | Pigment | 12.6 | 12.6 | 6.4 | 6.4 | 6.4 | 10.8 | 10.8 | 10.8 | 10.8 | 10.8 |
|  | Pigment Derivative | 1.4 | 1.4 | 1.6 | 1.6 | 1.6 | 1.2 | 1.2 | 1.2 | 1.2 | 1.2 |
|  | Acrylic Resin Solution 1 | 30.0 | 30.0 | 60.0 | 60.0 | 60.0 | 40.0 | 40.0 | 40.0 | 40.0 | 40.0 |
|  | Organic Solvent | 26.0 | 26.0 | 2.0 | 2.0 | 2.0 | 18.0 | 18.0 | 18.0 | 18.0 | 18.0 |
|  | Total | 70.0 | 70.0 | 70.0 | 70.0 | 70.0 | 70.0 | 70.0 | 70.0 | 70.0 | 70.0 |

<Preparation of Colored Compositions (Alkali Development Type Resist Materials) RP-1-6, GR-1-6 and BR-1-4>

Each of mixtures shown in Table 3 (red colored composition), in Table 4 (green colored composition) and in Table 5 (blue colored composition) was stirred and mixed uniformly, and then filtered through a 1-μm filter to afford each colored composition (alkali development type resist material). "CGI OXE-01" manufactured by Ciba Specialty Chemicals was used as the photopolymerization initiator, and "ALONIX M402" manufactured by Toagosei Co., Ltd. was used as the mixture of pentaerythritol hexacrylate/pentacrylate.

TABLE 3

| Resist | | RR-1 | RR-2 | RR-3 | RR-4 | RR-5 | RR-6 |
|---|---|---|---|---|---|---|---|
| Composition (parts) | Pigment Dispersion RP-1 (PR254) | 64.8 | 32.4 | | | | 16.2 |
| | Pigment Dispersion RP-2 (PR177) | | 32.4 | 16.2 | 32.4 | 48.6 | 48.6 |
| | Pigment Dispersion RP-3 (PR179) | | | 48.6 | 32.4 | 16.2 | |
| | Acrylic Resin Solution 1 | 2.4 | 2.4 | 2.4 | 2.4 | 2.4 | 2.4 |
| | Dipentaerythritol hexacrylate/pentacrylate Mixture | 5.0 | 5.0 | 5.0 | 5.0 | 5.0 | 5.0 |
| | Photopolymerization Initiator | 1.6 | 1.6 | 1.6 | 1.6 | 1.6 | 1.6 |
| | Methoxypropyl acetate | 26.2 | 26.2 | 26.2 | 26.2 | 26.2 | 26.2 |
| | Total | 100.0 | 100.0 | 100.0 | 100.0 | 100.0 | 100.0 |

TABLE 4

| Resost | | GR-1 | GR-2 | GR-3 | GR-4 | GR-5 | GR-6 |
|---|---|---|---|---|---|---|---|
| Composition (parts) | Pigment Dispersion GP-1 (PG36) | 30.2 | 22.0 | 20.0 | 25.6 | 27.8 | 22.0 |
| | Pigment Dispersion GP-2 (PG7) | | 9.9 | 12.4 | 7.1 | 12.7 | 9.9 |
| | Pigment Dispersion YP-1 (PY150) | 29.7 | 21.0 | 19.8 | 25.2 | 27.2 | 21.0 |
| | Pigment Dispersion YP-2 (PY185) | | 6.0 | 5.9 | | 7.7 | |
| | Pigment Dispersion YP-3 (PY139) | | | | | | 6.0 |
| | Acrylic Resin Solution 1 | 3.3 | 4.3 | 5.0 | 5.2 | 0.0 | 4.3 |
| | Dipentaerythritol hexacrylate/pentacrylate Mixture | 4.9 | 4.9 | 4.9 | 4.9 | 3.0 | 4.9 |
| | Photopolymerization Initiator | 2.4 | 2.4 | 2.4 | 2.4 | 2.0 | 2.4 |
| | Methoxypropyl acetate | 29.5 | 29.5 | 29.5 | 29.5 | 19.7 | 29.5 |
| | Total | 100.0 | 100.0 | 100.0 | 100.0 | 100.0 | 100.0 |

TABLE 5

| Resist | | BR-1 | BR-2 | BR-3 | BR-4 |
|---|---|---|---|---|---|
| Composition (parts) | Pigment Dispersion BP-1 (PB15:6) | 52.3 | 44.0 | 33.0 | 22.0 |
| | Pigment Dispersion VP-1 (PV23) | 2.8 | 11.0 | 22.0 | 33.0 |
| | Acrylic Resin Solution 1 | 8.2 | 8.2 | 8.2 | 8.2 |
| | Dipentaerythritol hexacrylate/pentacrylate Mixture | 4.9 | 4.9 | 4.9 | 4.9 |
| | Photopolymerization Initiator | 2.4 | 2.4 | 2.4 | 2.4 |
| | Methoxypropyl acetate | 29.5 | 29.5 | 29.5 | 29.5 |
| | Total | 100.0 | 100.0 | 100.0 | 100.0 |

<Preparation of Color Filters>

Examples 1 to 16 and Comparative Examples 1 to 7:

A black matrix was formed by patterning on a glass substrate, and the substrate was coated via a spin coater with the respective red colored composition shown in Tables 6 and 7, to form a film of the red colored composition. Using an ultra-high pressure mercury lamp, ultraviolet rays of 300 mJ/cm$^2$ were irradiated through a photomask onto the film. Subsequently, the film was spray-developed with an alkaline developing solution consisting of 2% sodium carbonate aqueous solution to remove the unexposed portions and then washed with ion exchanged water. The resultant substrate was heated at 230° C. for 20 minutes, thereby forming the respective red filter segment having a film thickness shown in Tables 9 and 10. By the same procedures, the respective green colored composition shown in Tables 6 and 7 was applied onto the substrate, irradiated with the ultraviolet rays through the photomask, and then developed to form respective green filter segment having a film thickness shown in Tables 9 and 10 on the right side of the red filter segment. Also, by the same procedures, the respective blue colored composition shown in Tables 6 and 7 was applied onto the substrate, irradiated with the ultraviolet rays through the photomask, and then developed to form the respective blue filter segment having a film thickness shown in Tables 9 and 10 on the upper side of the red filter segment, to manufacture the respective color filter.

TABLE 6

| | Red-Colored Composition | Green-Colored Composition | Blue-Colored Composition |
|---|---|---|---|
| Comp. Ex. 1-6 | RR-1 | GR-1 | BR-1 |
| Example 1 | RR-2 | GR-2 | BR-2 |
| Example 2 | RR-3 | GR-2 | BR-2 |
| Example 3 | RR-4 | GR-2 | BR-2 |
| Example 4 | RR-5 | GR-2 | BR-2 |
| Example 5 | RR-6 | GR-2 | BR-2 |
| Example 6 | RR-2 | GR-3 | BR-2 |
| Example 7 | RR-6 | GR-6 | BR-2 |
| Example 8 | RR-2 | GR-4 | BR-2 |

TABLE 7

| | Red-Colored Composition | Green-Colored Composition | Blue-Colored Composition |
|---|---|---|---|
| Comp. Ex. 7 | RR-1 | GR-1 | BR-1 |
| Example 9 | RR-4 | GR-3 | BR-3 |
| Example 10 | RR-3 | GR-3 | BR-3 |
| Example 11 | RR-5 | GR-3 | BR-3 |
| Example 12 | RR-4 | GR-2 | BR-3 |
| Example 13 | RR-4 | GR-3 | BR-4 |
| Example 14 | RR-4 | GR-4 | BR-3 |
| Example 15 | RR-2 | GR-5 | BR-2 |
| Example 16 | RR-2 | GR-2 | BR-2 |

<Evaluation of Hue of Color Filter>

The color filters manufactured in Examples 1 to 16 and Comparative Example 1 to 7, when irradiated with the light from a pseudo-white LED light source [SDPW 50 BOB manufactured by Seiwa Denki; the emission spectrum is as shown in FIG. 1. The wavelength ($\lambda 1$) at which the emission intensity becomes the maximum, the peak wavelengths $\lambda 2$ and $\lambda 3$ of the second and third emission intensities, and the emission intensities I2 and I3 at the wavelengths $\lambda 2$ and $\lambda 3$ assuming that the emission intensity (I1) at the wavelength ($\lambda 1$) is 100, are shown in Table 8], were measured for their color properties by means of a microscopic spectrophotometer ("OSP-SP100" manufactured by Olympus Corporation).

The chromaticity points (x, y) of each color filter segment in the CIE color coordinate system, the NTSC ratio, the lightness in white display, and the color temperature are shown in Tables 9 and 10.

TABLE 8

| | $\lambda 1$ | $\lambda 2$ | $\lambda 3$ | I1 | I2 | I3 |
|---|---|---|---|---|---|---|
| Wavelength and Relative intensity | 465 nm | 560 nm | 645 nm | 100 | 49 | 29 |

TABLE 9

| | Red | | | Green | | | Blue | | | White | | |
|---|---|---|---|---|---|---|---|---|---|---|---|---|
| | x | y | Y | x | y | Y | x | y | Y | x | y | Y |
| Comp. Ex. 1 | 0.640 | 0.344 | 18.9 | 0.302 | 0.602 | 49.9 | 0.135 | 0.055 | 4.4 | 0.326 | 0.335 | 24.4 |
| Comp. Ex. 2 | 0.594 | 0.340 | 22.5 | 0.316 | 0.507 | 70.1 | 0.134 | 0.059 | 5.3 | 0.323 | 0.332 | 32.6 |
| Comp. Ex. 3 | 0.666 | 0.333 | 13.7 | 0.302 | 0.604 | 49.1 | 0.134 | 0.057 | 4.9 | 0.304 | 0.324 | 22.6 |
| Comp. Ex. 4 | 0.660 | 0.339 | 15.7 | 0.311 | 0.563 | 59.9 | 0.133 | 0.073 | 8.3 | 0.296 | 0.316 | 28.0 |
| Comp. Ex. 5 | 0.654 | 0.342 | 17.1 | 0.314 | 0.540 | 64.6 | 0.133 | 0.062 | 6.1 | 0.311 | 0.328 | 29.3 |
| Comp. Ex. 6 | 0.670 | 0.330 | 12.5 | 0.313 | 0.553 | 62.2 | 0.133 | 0.079 | 9.4 | 0.283 | 0.312 | 28.0 |
| Ex. 1 | 0.648 | 0.322 | 15.0 | 0.297 | 0.604 | 49.4 | 0.136 | 0.057 | 5.4 | 0.301 | 0.312 | 23.3 |
| Ex. 2 | 0.648 | 0.334 | 12.8 | 0.297 | 0.604 | 49.4 | 0.136 | 0.057 | 5.4 | 0.288 | 0.314 | 22.5 |
| Ex. 3 | 0.648 | 0.320 | 12.4 | 0.297 | 0.604 | 49.4 | 0.136 | 0.057 | 5.4 | 0.289 | 0.312 | 22.4 |
| Ex. 4 | 0.648 | 0.309 | 12.0 | 0.297 | 0.604 | 49.4 | 0.136 | 0.057 | 5.4 | 0.289 | 0.309 | 22.3 |
| Ex. 5 | 0.648 | 0.310 | 13.0 | 0.297 | 0.604 | 49.4 | 0.136 | 0.057 | 5.4 | 0.294 | 0.310 | 22.6 |
| Ex. 6 | 0.648 | 0.322 | 15.0 | 0.293 | 0.604 | 47.8 | 0.136 | 0.057 | 5.4 | 0.300 | 0.309 | 22.7 |
| Ex. 7 | 0.648 | 0.310 | 13.0 | 0.298 | 0.604 | 44.0 | 0.136 | 0.057 | 5.4 | 0.294 | 0.297 | 20.8 |
| Ex. 8 | 0.648 | 0.322 | 15.0 | 0.291 | 0.604 | 46.9 | 0.136 | 0.057 | 5.4 | 0.299 | 0.307 | 22.4 |

| | NTSC Ratio | Color Temp. (K) | Thickness of Filter Segment (μm) | | |
|---|---|---|---|---|---|
| | | | Red | Green | Blue |
| Comp. Ex. 1 | 72% | 5,820 | 1.20 | 3.10 | 4.00 |
| Comp. Ex. 2 | 49% | 5,964 | 0.80 | 1.20 | 3.30 |
| Comp. Ex. 3 | 77% | 7,059 | 2.80 | 3.20 | 3.55 |
| Comp. Ex. 4 | 67% | 7,702 | 2.00 | 2.00 | 2.00 |
| Comp. Ex. 5 | 63% | 6,600 | 1.60 | 1.60 | 2.80 |
| Comp. Ex. 6 | 66% | 8,729 | 3.40 | 1.80 | 1.73 |
| Ex. 1 | 75% | 7,396 | 1.55 | 1.79 | 1.73 |
| Ex. 2 | 74% | 8,314 | 1.20 | 1.79 | 1.73 |
| Ex. 3 | 75% | 8,324 | 1.40 | 1.79 | 1.73 |
| Ex. 4 | 76% | 8,372 | 1.67 | 1.79 | 1.73 |
| Ex. 5 | 76% | 7,962 | 1.89 | 1.79 | 1.73 |
| Ex. 6 | 76% | 7,577 | 1.55 | 1.83 | 1.73 |
| Ex. 7 | 76% | 8,289 | 1.89 | 2.26 | 1.73 |
| Ex. 8 | 76% | 7,667 | 1.55 | 1.99 | 1.73 |

TABLE 10

| | Red | | | Green | | | Blue | | | White | | |
|---|---|---|---|---|---|---|---|---|---|---|---|---|
| | x | y | Y | x | y | Y | x | y | Y | x | y | Y |
| Comp. Ex. 7 | 0.675 | 0.325 | 10.8 | 0.302 | 0.604 | 49.1 | 0.137 | 0.046 | 2.3 | 0.327 | 0.378 | 20.7 |
| Ex. 9 | 0.675 | 0.315 | 10.4 | 0.293 | 0.604 | 47.8 | 0.138 | 0.050 | 4.2 | 0.291 | 0.319 | 20.8 |
| Ex. 10 | 0.675 | 0.320 | 10.3 | 0.293 | 0.604 | 47.8 | 0.138 | 0.050 | 4.2 | 0.290 | 0.320 | 20.8 |
| Ex. 11 | 0.675 | 0.309 | 10.5 | 0.293 | 0.604 | 47.8 | 0.138 | 0.050 | 4.2 | 0.293 | 0.318 | 20.8 |
| Ex. 12 | 0.675 | 0.315 | 10.4 | 0.297 | 0.604 | 49.4 | 0.138 | 0.050 | 4.2 | 0.293 | 0.323 | 21.3 |

TABLE 10-continued

| | | | | | | | | | | | | |
|---|---|---|---|---|---|---|---|---|---|---|---|---|
| Ex. 13 | 0.675 | 0.321 | 12.7 | 0.297 | 0.604 | 49.4 | 0.144 | 0.050 | 3.9 | 0.312 | 0.331 | 22.0 |
| Ex. 14 | 0.675 | 0.315 | 10.4 | 0.291 | 0.604 | 46.9 | 0.138 | 0.050 | 4.2 | 0.291 | 0.317 | 20.5 |
| Ex. 15 | 0.671 | 0.322 | 13.2 | 0.282 | 0.644 | 38.4 | 0.136 | 0.052 | 4.5 | 0.300 | 0.301 | 18.7 |
| Ex. 16 | 0.671 | 0.322 | 13.2 | 0.292 | 0.620 | 45.6 | 0.136 | 0.052 | 4.5 | 0.303 | 0.316 | 21.1 |

| | NTSC Ratio | Color Temp. (K) | Thickness of Filter Segment (μm) | | |
|---|---|---|---|---|---|
| | | | Red | Green | Blue |
| Comp. Ex. 7 | 80% | 5,704 | 4.49 | 3.20 | 7.00 |
| Ex. 9 | 81% | 7,949 | 1.81 | 1.83 | 1.38 |
| Ex. 10 | 81% | 8,051 | 1.56 | 1.83 | 1.38 |
| Ex. 11 | 81% | 7,858 | 2.13 | 1.83 | 1.38 |
| Ex. 12 | 81% | 7,737 | 1.81 | 1.79 | 1.38 |
| Ex. 13 | 80% | 6,532 | 2.30 | 1.79 | 1.02 |
| Ex. 14 | 81% | 8,057 | 1.81 | 1.99 | 1.38 |
| Ex. 15 | 88% | 7,712 | 2.10 | 2.20 | 2.10 |
| Ex. 16 | 83% | 7,240 | 2.10 | 2.10 | 2.10 |

When the color filters of Examples 1 to 8 were used, the NTSC ratio was 72% or higher, the color temperature was 6000K or higher, the film thickness of each color filter segment was 3.3 μm or less, the lightness and color reproducibility of white was excellent, and the productivity of the color filters was also excellent.

On the other hand, when the color filter of Comparative Example 1 was used, the NTSC ratio was 74%, substantially the same as that when the color filters of Examples 1 to 6 were used, but the color temperature was lower than 6000K, and the film thickness of the blue filter segment exceeded 3.3 μm. When the color filter of Comparative Example 2 was used, the NTSC ratio did not reach 72%, and the color temperature was less lower than 6000K, though the film thickness of each color filter segment was 3.3 μm or less. When the color filter of Comparative Example 3 was used, the NTSC ratio was 77%, the color temperature was 6000K or higher, and the film thicknesses of the red and green filter segments were 3.3 μm or less, but the film thickness of the blue filter segment exceeded 3.3 μm. When the color filters of Comparative Examples 4 and 5 were used, the film thickness of each color filter segment was 3.3 μm or less, and the color temperature was 6000K or higher, but the NTSC ratio did not reach 72%. When the color filter of Comparative Example 6 was used, the color temperature was 6000K or higher, but the NTSC ratio did not reach 72%, and the film thickness of the red filter segment exceeded 3.3 μm.

Next, when the color filters of Examples 9 to 16, in which the NTSC ratio was 80% or higher, were used, the color temperature was 6000K or higher, and the film thickness of each color filter segment was 3.3 μm or less. On the other hand, when the color filter of Comparative Example 7 was used, the NTSC ratio was 80%, substantially the same as that when the color filters of Examples 9 to 16 were used, but the color temperature was lower than 6000K, and the film thicknesses of the red and blue filter segments exceeded 3.3 μm.

As has been described above, the color filters of the present invention are excellent in color reproducibility and also in white color reproducibility.

What is claimed is:

1. A color filter comprising a red filter segment, a green filter segment and a blue filter segment, on a substrate, wherein when a pseudo-white LED is used which has spectral properties such that it has a peak wavelength ($\lambda 1$) at which an emission intensity becomes the highest, within a wavelength range of 430 nm to 485 nm, a peak wavelength ($\lambda 2$) of a second emission intensity within a wavelength range of 520 nm to 580 nm and a peak wavelength ($\lambda 3$) of a third emission intensity within a wavelength range of 610 nm to 670 nm, a ratio (I2/I1) of an emission intensity I2 at the wavelength $\lambda 2$ to an emission intensity I1 at the wavelength $\lambda 1$ is 0.2 or more, but 0.7 or less, and a ratio (I3/I1) of an emission intensity I3 at the wavelength $\lambda 3$ to the emission intensity I1 at the wavelength $\lambda 1$ is also 0.2 or more, but 0.7 or less, an area of a triangle defined by three chromaticity points of the red, green and blue filter segments expressed as ($x_R$, $y_R$), ($x_G$, $y_G$) and ($x_B$, $y_B$) on the x-y chromaticity diagram occupies 72% or more of an area standard triangle defined by 3 points of red (0.67, 0.33), green (0.21, 0.71) and blue (0.14, 0.08), and the color filter has a color temperature of 6000K or more, wherein each of the red, green and blue filter segments has a thickness of 3.3 μm or less, and wherein the green filter segment contains (i) C.I. Pigment Green 36, C.I. Pigment Green 7 and C.I. Pigment Yellow 150 in a weight ratio of 20-80/15-75/5-65, (ii) C.I. Pigment Green 36, C.I. Pigment Green 7 and C.I. Pigment Yellow 185 in a weight ratio of 20-80/15-75/5-65, (iii) C.I. Pigment Green 36, C.I. Pigment Green 7 and C.I. Pigment Yellow 139 in a weight ratio of 20-80/15-75/5-65, (iv) C.I. Pigment Green 36, C.I. Pigment Yellow 150 and C.I. Pigment Yellow 185 in a weight ratio of 40-90/15-55/5-55, or (v) C.I. Pigment Green 36, C.I. Pigment Green 7, C.I. Pigment Yellow 150 and C.I. Pigment Yellow 185 in a weight ratio of 20-80/5-70/5-70/5-70.

2. The color filter according to claim 1, wherein the red filter segment contains at least two pigments selected from the group consisting of C.I. Pigment Red 254, C.I. Pigment Red 177 and C.I. Pigment Red 179.

3. The color filter according to claim 1, wherein the blue filter segment contains C.I. Pigment Blue 15:6 and C.I. Pigment Violet 23, and a ratio ($G_{B15:6}/G_{V23}$) of weight ($G_{B15:6}$) of the C.I. Pigment Blue 15:6 to weight ($G_{V23}$) of the C.I. Pigment Violet 23 is 85/15 to 40/60.

4. The color filter according to claim 1, wherein:
the red filter segment contains at least two pigments selected from the group consisting of C.I. Pigment Red 254, C.I. Pigment Red 177 and C.I. Pigment Red 179; and
the blue filter segment contains C.I. Pigment Blue 15:6 and C.I. Pigment Violet 23, and a ratio ($G_{B15:6}/G_{V23}$) of weight ($G_{B15:6}$) of the C.I. Pigment Blue 15:6 to weight ($G_{V23}$) of the C.I. Pigment Violet 23 is 85/15 to 40/60.

5. A liquid crystal display device comprising a color filter according to claim 1, and a pseudo-white LED having spectral properties such that it has a peak wavelength ($\lambda 1$) at which an emission intensity becomes the highest, within a wavelength range of 430 nm to 485 nm, a peak wavelength ($\lambda 2$) of a second emission intensity within a wavelength range of 520 nm to 580 nm and a peak wavelength ($\lambda 3$) of a third emission intensity within a wavelength range of 610 nm to 670 nm, a ratio ($I2/I1$) of an emission intensity $I2$ at the wavelength $\lambda 2$ to an emission intensity $I1$ at the wavelength $\lambda 1$ is 0.2 or more, but 0.7 or less, and a ratio ($I3/I1$) of an emission intensity $I3$ at the wavelength $\lambda 3$ to the emission intensity $I1$ at the wavelength $\lambda 1$ is also 0.2 or more, but 0.7 or less.

* * * * *